United States Patent [19]
Masaki

[11] 3,950,464
[45] Apr. 13, 1976

[54] METHOD FOR PRODUCING A SINTERED SILICON NITRIDE BASE CERAMIC AND SAID CERAMIC
[75] Inventor: Hideyuki Masaki, Nagoya, Japan
[73] Assignee: Kabushiki Kaisha Toyota Chuo Kenkysusho, Nagoya, Japan
[22] Filed: Oct. 23, 1973
[21] Appl. No.: 408,358

[30] Foreign Application Priority Data
Oct. 24, 1972 Japan............................ 47-106817

[52] U.S. Cl. ...................... 264/65; 106/62; 106/65; 106/73.5; 264/66; 264/332
[51] Int. Cl.$^2$ ...................... F27D 7/06; C04B 35/58
[58] Field of Search ......... 106/62, 65, 73.5; 264/65, 264/66, 332

[56] References Cited
UNITED STATES PATENTS
3,549,402  12/1970  Whitney............................ 264/65
3,811,928  5/1974  Henney et al....................... 264/65

OTHER PUBLICATIONS
Kingery, Introduction to Ceramics, p. 40, (1967).
Coles et al., "Formation and Reactivity of Nitrides: III, Boron, Aluminum, and Silicon Nitrides," J. Appl. Chem., 19, [6] pp. 178–181, (1969) – Abstract.

Primary Examiner—Donald J. Arnold
Assistant Examiner—John Parrish
Attorney, Agent, or Firm—Blum Moscovitz Friedman & Kaplan

[57]  ABSTRACT

A silicon nitride based ceramic is formed of silicon nitride and at least two metal oxides of such a type that when the metal oxides are heated separately they form a spinel. Combination of said metal oxides and said silicon nitride as fine powders and sintering same at a specified temperature for a specified period of time results in a silicon nitride based ceramic having improved mechanical and chemical properties.

2 Claims, No Drawings

METHOD FOR PRODUCING A SINTERED SILICON NITRIDE BASE CERAMIC AND SAID CERAMIC

BACKGROUND OF THE INVENTION

Recently, ceramics composed principally of silicon nitride have found wide use because of the fact that they display superior heat resistance, superior thermal shock resistance, high strength and high corrosion resistance against molten non-ferrous metals and against oxygen at high temperature. In general, it is difficult to prepare silicon nitride ceramics by sintering so that it is difficult to obtain a silicon nitride ceramic having low porosity and high strength by any method other than hot-pressing. However, the hot-pressing method is applicable only to those cases in which the product is of a relatively simple profile, so that a method for forming a sintered silicon nitrate of complex profile having a low porosity and high strength has been sought in this art.

A technique other than hot-pressing which has been used is to form a compact of silicon powder and to heat the compact gradually in an atmosphere of nitrogen or gaseous ammonia so that the silicon is nitrided and sintered at the same time. However, the porosity of the product is generally at least 20 percent so that the strength of the product is low.

SUMMARY OF THE INVENTION

A powder mixture containing 60 to 92 mol percent of silicon nitride with the remainder being metal oxide is prepared. The metal oxide consists of at least one member selected from a first group consisting of MgO, ZnO and NiO, and at least one member of a second group consisting of $Al_2O_3$, $Cr_2O_3$, $Y_2O_3$, $TiO_2$ and $SnO_2$. The mol ratio of member or members of the first group to member or members of the second group lies between 1:9 and 9:1. In a first embodiment of the process, the mixed metals are heated to betweeen 1600° and 1800°C for 2 to 3 hours. In a second embodiment of the invention the members of the two groups of metal oxides are first heated to a temperature high enough and for a period long enough to form a spinel, then cooled and reground, after which the metal oxides in the form of a spinel are mixed with the silicon nitride and sintered as above. Sintering is carried out in an inert atmosphere such as nitrogen or argon.

An object of the present invention is an improved silicon nitride based ceramic having improved strength and corrosion resistance.

Another object of the present invention is an improved silicon nitride based ceramic containing metal oxides, said ceramic having high strength and high corrosion resistance.

A further object of the present invention is an improved silicon nitride based ceramic including metal oxides from at least two groups where the ceramic has high strength and high corrosion resistance.

Yet another object of the present invention is an improved silicon nitride based ceramic containing metal oxides in a proportion such that the metal oxides themselves may be formed into a spinel when heated to a sufficiently high temperature for a sufficiently long period of time.

Still other objects and advantages of the invention will in part be obvious and will in part be apparent from the specification.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

DESCRIPTION OF THE PREFERRED EMBODIMENTS

Sintered articles based on silicon nitride and having the properties of low porosity, high strength and high corrosion resistance are obtained by sintering said silicon nitride in combination with metal oxides which are such that when heated alone to a suitable sintering temperature spinels are formed. Spinels are crystals of the cubic system and have the general formula $RO \cdot R'_2O_3$ where R and R' are metal elements and the pure spinel consists of one mol of divalent oxide and one mol of trivalent oxide. Further, it is known that spinels can be formed between a divalent metal oxide and a tetravalent metal oxide such as that of titanium or tin or the like. Where the spinel is made from a divalent and a tetravalent metal oxide, the usual ratio is 2 mols of a divalent oxide to 1 mol of the tetravalent metal oxide. Tests have shown that sintered articles of low porosity and high strength are not always obtained when silicon nitride powder is combined with oxides in such a ratio as to form a spinel. However, the desired properties can be obtained with a restricted group of oxides where the ratio of the oxides to each other and the ratio of the oxides to the silicon nitride lies between specific limits. The metal oxides which have been found suitable for forming silicon nitride based ceramics of high strength and high corrosion resistance are MgO, ZnO and NiO as the divalent metal oxides, $Al_2O_3$, $Cr_2O_3$ and $Y_2O_3$ as the trivalent metal oxides and $TiO_2$ and $SnO_2$ as the tetravalent metal oxides.

In accordance with the present invention, the divalent metal oxides are regarded as forming one group and the trivalent and tetravalent metal oxides are regarded as a second group. In the compositions in accordance with the present invention at least one member is selected from the first group and at least one member is selected from the second group to be sintered with the $Si_3N_4$.

In addition to the above metal oxides, a small quantity of CaO or CoO may be included in the sintered silicon nitride based ceramic without lowering the strength thereof. However, tests have shown that other metal oxides may lower the strength and corrosion resistance of the silicon nitride based ceramic produced. Nevertheless, other advantages may be obtained such as lowering the sintering temperature. The addition of silicon dioxide produces this effect.

As aforenoted, the pure spinel structure is formed between one mol of the divalent metal oxide and one mol of the trivalent metal oxide, or between two mols of the divalent metal oxide and one mol of the tetravalent metal oxide. However, in accordance with the present invention, 10 to 90 mol percent of the divalent metal oxides are used with 90 to 10 mol percent of the trivalent or tetravalent metal oxides, said metal oxide being selected from the two groups presented above. The produce formed when the members of the two groups of oxides are not in the true spinel ratio is not exactly a spinel but rather a solid solution having a spinel-like structure. Such spinel-like materials in combination with silicon nitride give a sintered product which has the improved properties desired to an extent which is quite comparable with what is achieved by using said materials in the ratio necessary for giving a pure spinel.

When the silicon nitride content is less than 60 mol percent (i.e., the oxide content is more than 40 mol percent), the strength of the silicon nitride ceramic decreases and owing to the metal oxides having relatively low strength, the strength of the article is seriously lowered. Also, when the silicon nitride content is more than 92 mol percent (i.e., the spinel content is less than 8 percent), it becomes difficult to sinter the material, and a product of low porosity cannot be easily obtained, and therefore its strength is remarkably lowered. Therefore, the silicon nitride content in the mixed material powder is limited from 60 to 92 molar percent.

The reason why the superior sintered article of low porosity and high strength can be obtained by combining the silicon nitride powder with said metal oxides to form spinels has not yet completely been understood in detail. However, the following is believed to be the mechanism. The magnesium oxide or aluminum oxide is believed to dissolve in the silicon nitride in the sense that metal atoms from the oxides are substituted for the silicon in the nitride and the magnesium and aluminum ions take on tetrahedral coordination. But since positive ions of magnesium oxide or aluminum oxide alone form structures of hexahedral coordination and the structure must change over to tetrahedral coordination for the solid to be dissolved in silicon nitride, consequently, a high activation energy is needed. In contrast, most of the positive ions of spinel form a tetrahedral coordinated structure which is similar to the case of a solid dissolved in silicon nitride so that the activation energy for the solution process is low and the sintering operation progresses easily. Thus it is considered the reason for superior properties of silicon nitride in combination with oxides which form spinels, or spinel-like structures is accounted for.

With respect to the process of the present invention as described above, it is believed that the reaction which occurs first during the sintering operation is the conversion of the metal oxides to spinel-like structures and then the spinels dissolve in the silicon nitride to promote the sintering operation of the silicon nitride.

While the process of the present invention can be carried out by mixing the metal oxides together with the silicon nitride, or compounds being in the form of fine powders, and then sintering, a preferred method is to combine one or more members of the first group of metal oxides with one or more members of the second group of metal oxides in finely powdered form and to sinter the metal oxides alone. The sintered metal oxides which have now formed a spinel-like structure are then finely ground and mixed with the silicon nitride and formed into a compact to be treated as above. Using this method, the product obtained after sintering has lower porosity and higher strength than the product obtained by the first method. It is believed that the reason is that the metal oxides react more effectively to form the desired spinel-like structure so that the conversion is more complete and in the sintering operation, the dissolution process by which the spinels are dissolved in the silicon nitride to aid the sintering operation progresses more effectively. Following are examples describing the method of preparation of the ceramics in accordance with the present invention.

EMBODIMENT 1

60 to 92 mol percent of silicon nitride powder having a maximum size of less than 300 mesh and having a purity of 98% is mixed with 4 to 36 mol percent of magnesium oxide of the same mesh and high purity and 4 to 36 mol percent of alumina of similar quality. The mixture is compacted at a pressure of 500 kg/cm$^2$ and sintered for 2 to 3 hours at a temperature of 1600° to 1800°C in an inert atmosphere, preferably of argon or nitrogen. By this means, samples of 40mm × 20mm × 6mm are produced and the various properties such as specific gravity, porosity, bending strength, oxidation resistance and thermal-expansion coefficient may be measured. Specific sample compositions with their properties are shown in Table 1. Also, for comparison, the properties of compositions with silicon nitride obtained with aluminum oxide alone and with magnesium oxide alone are given for comparison in the same Table.

The methods of measuring the properties shown in the various Tables were as follows. The porosity was calculated from the measured specific gravity assuming that the specific gravity of sintered silicon nitride is 3.19 when its porosity is 0 percent. The bending strength was measured by means of the 3-point supporting method, the span of the outer points being 30mm. For the oxidation resistance test, the increment in weight was measured after 48 hours at 1200°C in air, and the result was shown as the increase in weight per unit area, measured in mg/cm$^2$. For the thermal-expansion coefficient, the article was heated from 20°C to 400°C and the average thermal-expansion coefficient within the range was measured. Now noting the values given in Table 1, by sintering mixtures of powder containing 60 to 92 mol percent of silicon nitride together with mixtures of metal oxides in accordance with the present invention where the MgO content ranges from Table 1

| | Sample number | Quantity (mol %) | | | Sintering Temperature(°C) | Specific gravity (g/cm$^3$) | Porosity | Bending strength (kg/mm$^2$) | Oxidation resistance (mg/cm$^2$) | Thermal-expansion coefficient (20–400°C) (×10$^{-6}$/°C) |
|---|---|---|---|---|---|---|---|---|---|---|
| | | Si$_3$N$_4$ | Al$_2$O$_3$ | MgO | | | | | | |
| Samples of the present invention | 1 | 92 | 4 | 4 | 1750 | 3.01 | 7 | 31.0 | 2.8 | 2.5 |
| | 2 | 70 | 4 | 26 | 1750 | 2.70 | 15 | 24.0 | 5.2 | 2.4 |
| | 3 | 60 | 4 | 36 | 1750 | 2.75 | 14 | 24.8 | 6.3 | 2.4 |
| | 4 | 90 | 5 | 5 | 1750 | 3.05 | 4 | 40.0 | 1.5 | 2.4 |
| | 5 | 79 | 6 | 15 | 1780 | 3.03 | 5 | 38.5 | 1.8 | 2.4 |
| | 6 | 79 | 6 | 15 | 1600 | 2.70 | 15 | 23.0 | 10.6 | 2.4 |
| | 7 | 65 | 15 | 20 | 1750 | 3.00 | 6 | 32.5 | 2.0 | 2.4 |
| | 8 | 76 | 20 | 4 | 1750 | 2.86 | 10 | 29.2 | 3.6 | 2.4 |
| | 9 | 60 | 36 | 4 | 1750 | 2.90 | 9 | 30.6 | 2.8 | 2.4 |
| Samples for comparison | 101 | 85 | 15 | 0 | 1780 | 2.53 | 20 | 16.0 | 10.0 | 2.4 |
| | 102 | 75 | 0 | 25 | 1780 | 2.40 | 25 | 15.5 | 15.0 | 2.4 |

90 mol percent (sample 3) to 10 mol percent (sample 9), it is apparent from Table 1 that the porosity is from 4 to 15 percent, the bending strength is from 23 to 40 kg/mm² and the oxidation resistance is from 1.8 to 10.6 mg/cm². These values are definitely superior to those of the comparison samples which showed a porosity of 20 to 25 percent, bending strength of 15 to 16 kg/mm² and an oxidation resistance of 10 to 15 mg/cm². The superiority of the product resulting from compositions in accordance with the present invention is particularly evident in the silicon nitride ceramic of sample 4 where the porosity is 4 percent, the bending strength is 40.0 kg/mm² and the oxidation resistance is 1.5 mg/cm², these values being nearly equal to those of sintered articles of silicon nitride formed by the hot-press method.

With respect to the sintering temperature, at temperatures lower than 1600°C it is difficult to obtain articles of low porosity whereas when it is higher than 1800°C a decrease in weight was observed indicating either that decomposition or sublimation was occurring. With respect to the sintering time, the reactions are not complete if the period is less than 2 hours and where the period is longer than 3 hours, the growth of crystal particles of silicon nitride was observed. So far as the inert gas is concerned, no difference was noted between the products made in argon or in nitrogen. Summing up, the preferable sintering conditions are a temperature of 1600°C to 1800°C, a sintering time from 2 hours to 3 hours, and an inert gas atmosphere.

EMBODIMENT 2

Silicon nitride, aluminum oxide and magnesium oxide powders similar to those used in the examples of embodiment 1 were employed. According to this embodiment, initially, magnesium oxide and aluminum oxide were mixed in several mol ratios and were heated for 3 to 10 hours at a temperature of 1600°C to 1800°C in order to form spinels. After this reaction was complete, the spinels were cooled and pulverized to a particle size finer than 300 mesh, this powder was mixed with silicon nitride powder of the same mesh, after which the powder mixture was treated as in Embodiment 1. The properties were measured. Examples are given in Table 2.

It is apparent from the Table 2 that the porosity is 1.8 to 4.5 percent, the bending strength is 32 to 65 Kg/mm² and the oxidation resistance is 0.6 to 1.2mg/cm² with the sintered substances produced by this method. These values are much better than those of the sintered articles of silicon nitride produced by the method of the embodiment 1 shown in the Table 1. Especially, with the sintered article of silicon nitride of the sample number 11, the porosity is 1.8 percent, the bending strength is 65.0 kg/mm² and the oxidation resistance is 0.5mg/cm²; the values of the properties are nearly equal to those of the sintered article of silicon nitride obtained by means of the hot-press method.

A crucible of 50mm height, 40mm inner diameter and 3mm thickness was formed of the sintered silicon nitride of the sample number 11 by the slip casting method, and it was sintered for 3 hours at 1750°C in an atmosphere of nitrogen gas. The crucible thus obtained was used for melting aluminum. Even when the aluminum was heated to 1100°C, the crucible was not attacked, the surface of the crucible was not oxidized, and also aluminum did not permeate into the crucible. In contrast, when a crucible of the sintered silicon nitride formed by the conventional reactive sintering method was tested at 900°C with aluminum, the surface was first oxidized and the crucible was eventually destroyed.

EMBODIMENT 3

Mixed material of divalent metal oxides (MgO, ZnO, NiO) and trivalent metal oxides ($Cr_2O_3$, $Al_2O_3$, $Y_2O_3$) having the same mol quantity as each other, and the mixed powder of divalent metal oxide (MgO) and tetravalent metal oxides ($TiO_2$, $SnO_2$) in a mol ratio of 2 to 1 (each powder is finer than 300 mesh) were respectively made by the same method as that of the second embodiment. They were heated for 3 to 10 hours at temperatures of 1300° to 1600°C to form the spinels ($MgCr_2O_4$, $ZnAl_2O_4$, $NiAl_2O_4$, $MgY_2O_4$, 2 $MgO.TiO_2$, $2MgO.SnO$) respectively. After this process, the spinels were pulverized to powder (finer than 300 mesh), and the powder was mixed with silicon nitride powder to make the mixed material, and the sintered articles of silicon nitride were produced by the same method as that of the first embodiment, and then the properties of the articles were measured. The compositions and results are shown in Table 3.

Table 2

| | sample number | quantity (molar %) | | | sintering temperature (°C) | specific gravity (g/cm³) | porosity (%) | bending strength (kg/mm²) | oxidation resistance (mg/cm²) | thermal-expansion coefficient (20–400°C) (×10⁻⁶/°C) |
|---|---|---|---|---|---|---|---|---|---|---|
| | | $Si_3N_4$ | $Al_2O_3$ | MgO | | | | | | |
| Samples of the present invention | 10 | 60 | 4(10) | 36(90) | 1780 | 3.06 | 4.0 | 41.8 | 0.9 | 2.38 |
| | 11 | 90 | 5(50) | 5(50) | 1780 | 3.13 | 1.8 | 65.0 | 0.5 | 2.40 |
| | 12 | 79 | 6(29) | 15(71) | 1780 | 3.13 | 1.8 | 58.0 | 0.6 | 2.38 |
| | 13 | 79 | 6(29) | 15(71) | 1600 | 3.00 | 2.6 | 32.0 | 1.2 | 2.38 |
| | 14 | 60 | 30(75) | 10(25) | 1780 | 3.05 | 4.5 | 40.6 | 0.9 | 2.38 |

NOTE: Figures in parentheses are based on oxide content only.

Table 3

| | Sample number | Quantity (Mol %) | | | | Sintering Temperature (°C) | Specific Gravity (g/cm³) | Porosity (%) | Bending Strength (kg/mm²) | Oxidation resistance (mg/cm²) | thermal-expansion coefficient (20–400°C) (×10⁻⁶/°C) |
|---|---|---|---|---|---|---|---|---|---|---|---|
| | | $Si_3N_4$ | Spinels | | | | | | | | |
| | | | RO | | $R'_2O_3$ / $R''O_2$ | | | | | | |
| Samples of | 15 | 90 | MgO | 5 | $Cr_2O_3$ 5 | 1780 | 3.14 | 2 | 50.2 | 0.87 | 2.8 |

Table 3-continued

| | Sample number | Quantity (Mol %) | | | | Sintering Temperature (°C) | Specific Gravity (g/cm³) | Porosity (%) | Bending Strength (kg/mm²) | Oxidation resistance (mg/cm²) | thermal-expansion coefficient (20–400°C) (×10⁻⁶/°C) |
| --- | --- | --- | --- | --- | --- | --- | --- | --- | --- | --- | --- |
| | | Si₃N₄ | Spinels | | | | | | | | |
| | | | RO | | R'₂O₃ R''O₂ | | | | | | |
| the present invention | 16 | 90 | ZnO | 5 | Al₂O₃ 5 | 1780 | 3.02 | 7 | 40.1 | 2.9 | 2.6 |
| | 17 | 90 | NiO | 5 | Al₂O₃ 5 | 1780 | 3.08 | 4 | 42.3 | 2.8 | 2.6 |
| | 18 | 90 | MgO | 5 | Y₂O₃ 5 | 1780 | 3.17 | 0.5 | 45.0 | 0.8 | 2.6 |
| | 19 | 90 | MgO | 6.7 | TiO₂ 3.3 | 1780 | 3.09 | 3 | 46.7 | 1.6 | 2.6 |
| | 20 | 90 | MgO | 6.7 | SnO₂ 3.3 | 1780 | 2.97 | 8 | 36.5 | 5.2 | 2.6 |

It is apparent that the sintered article obtained by sintering the mixed powder of silicon nitride and spinels formed of magnesium oxide, zinc oxide and nickel oxide as divalent metal oxides, aluminum oxide, chromium oxide and yttrium oxide as trivalent metal oxides and titanium oxide and tin oxide as tetravalent metal oxides show superior strength (the bending strength being 36.5 to 50.2 kg/mm²), low porosity (0.5 to 8 percent) and superior oxidation resistance (0.87 to 2.9 mg/cm²).

As mentioned above, according to the present invention, 60 to 92 mol percent silicon nitride and 8 to 40 mol percent metal oxides are combined and mixed together with one another to comprise 100 mol percent of the final product as the material powder. Alternatively, the metal oxides are previously sintered to form spinels, and the spinels are minutely pulverized to powder. The powder is mixed with the silicon nitride powder to make the mixed material powder. Either of the two types of material powder are compacted by conventional methods, and sintered in non-oxidizing atmosphere to produce a sintered article of silicon nitride. Also, said metal oxides are composed of one kind or more than one kind of 10 to 90 mol percent magnesium oxide, zinc oxide and nickel oxide, and of one kind or more than one kind of 10 to 90 mol percent of aluminum oxide, chromium oxide, titanium oxide, tin oxide and yttrium oxide. By this method, sintered articles of silicon nitride ceramic having a complicated profile of superior properties, especially of high strength, can be easily produced at low cost. Further, a simple method which produces an article of superior quality and which has been desired is achieved.

It will thus be seen that the objects set forth above, among those made apparent from the preceding description, are efficiently attained and, since certain changes may be made in carrying out the above process and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A process of preparation of a silicon nitride based ceramic comprising the steps of combining 60 to 92 mol percent of finely powdered Si₃N₄ with at least one member of a first group consisting of MgO, ZnO and NiO and at least one member of a second group consisting of Al₂O₃, Cr₂O₃, Y₂O₃, TiO₂ and SnO₂, said Si₃N₄ powder and said members being in powdered form finer than 300 mesh, the mol ratio of said first group member or members to said second group member or members ranging from 1:9 to 9:1 and the combined total quantity of said members lying between 8 and 40 mol percent of the combination including said Si₃N₄, mixing said powdered materials, forming said mixed powders into a green compact and sintering said green compact at a temperature between 1600°C and 1800°C in an inert gas in the absence of applied pressure, the resultant composition consisting essentially of Si₃N₄ and members of said first and second groups.

2. The process as defined in claim 1 wherein said compact is formed at a pressure of at least about 500 Kg/cm².

* * * * *